(12) United States Patent
Ermer et al.

(10) Patent No.: US 6,622,109 B2
(45) Date of Patent: Sep. 16, 2003

(54) PHOTO TACHOMETER FOR A DIGITAL MULTIMETER

(75) Inventors: Corey Ermer, Weseca, MN (US);
David Tusa, Owatonna, MN (US);
Robert Kochie, Mantorville, MN (US)

(73) Assignee: SPX Corporation, Muskegon, MI (US)

( * ) Notice: Subject to any disclaimer, the term of this patent is extended or adjusted under 35 U.S.C. 154(b) by 59 days.

(21) Appl. No.: 09/933,752

(22) Filed: Aug. 22, 2001

(65) Prior Publication Data

US 2003/0040883 A1 Feb. 27, 2003

(51) Int. Cl.[7] .................................................. G01P 3/00
(52) U.S. Cl. ........................ 702/145; 702/184; 702/187; 701/33; 701/99
(58) Field of Search ................................. 702/145, 184, 702/187; 701/33, 99, 102; 324/174, 175, 207.25, 244.1

(56) References Cited

U.S. PATENT DOCUMENTS

| | | | | |
|---|---|---|---|---|
| 4,375,672 A | * | 3/1983 | Kato et al. | 701/102 |
| 4,425,791 A | * | 1/1984 | Kling | 73/117.3 |
| 5,541,840 A | * | 7/1996 | Gurne et al. | 701/33 |
| 5,719,497 A | * | 2/1998 | Veeser et al. | 324/174 |
| 6,429,658 B1 | * | 8/2002 | Thomsen et al. | 324/391 |
| 6,459,968 B1 | * | 10/2002 | Kochie | 701/29 |

* cited by examiner

Primary Examiner—Bryan Bui
Assistant Examiner—Hien Vo
(74) Attorney, Agent, or Firm—Baker & Hostetler, LLP

(57) ABSTRACT

A apparatus for determining the rotational speed of an object or an assembly. The apparatus includes a device that emits a light as well as detect the light reflected from the measured object. A reflective surface is attached to the object to enable it to reflect the light from the device. The device is connected to an analyzer that reads the detected signal and display the results.

21 Claims, 2 Drawing Sheets

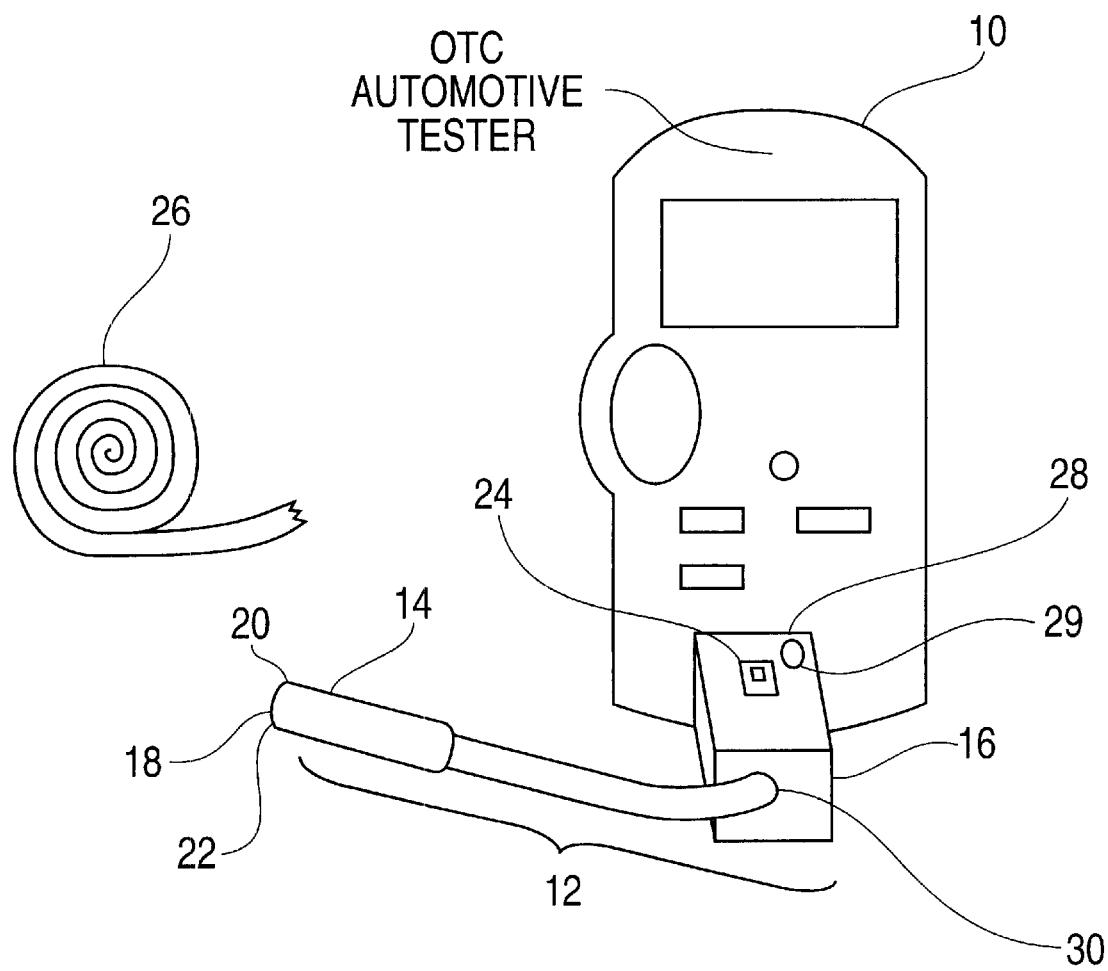

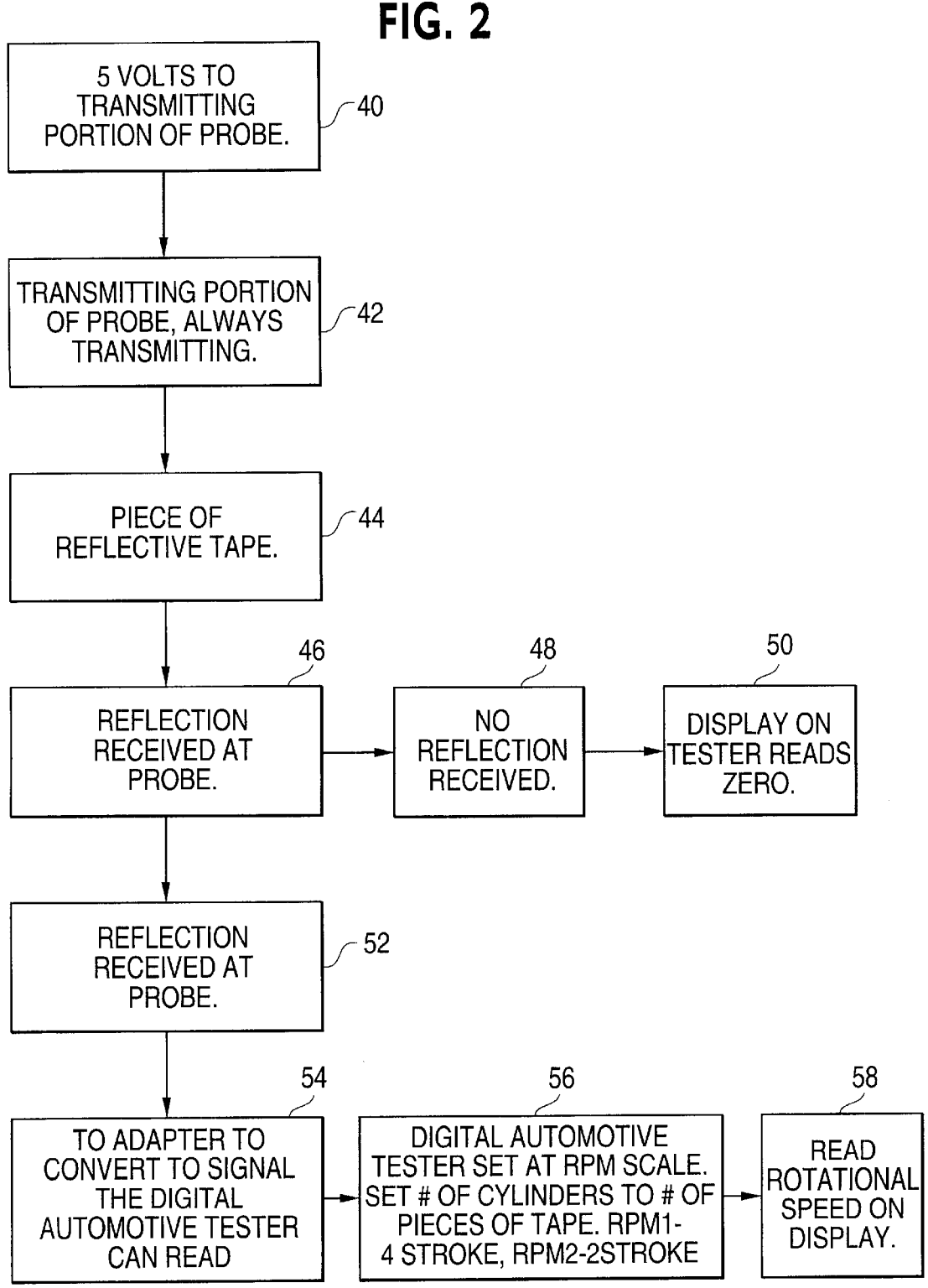

PHOTO TACHOMETER FOR A DIGITAL MULTIMETER

FIELD OF THE INVENTION

The present invention relates generally to analyzing the performance of specific objects. More particularly, the present invention relates to determining the rotational speed of objects through the use of a handheld device.

BACKGROUND OF THE INVENTION

The servicing of modern automotive vehicles has become extremely complicated and, to some extent, virtually impossible for some persons because of the complexity of the vehicle, the inadequacy of available specifications on the vehicle and the changes in regulatory requirements applicable to the vehicle. Further, the capability of some diagnostic equipment used in diagnosing and servicing vehicles has not kept pace with changes in the vehicles. Added to these complications is a growing scarcity of personnel trained in servicing such complicated equipment. For example, whereas it had been possible to service many vehicles with internal combustion engines by checking the condition of ignition parts, adjustments of carburetors, or condition of electrical systems and replacing some or all parts, the newer vehicles have engines that do not have the older conventional ignition parts, the fuel supply is not easily adjusted, and the electrical system is sometimes separately controlled by its own built-in computer. Further, some governmental regulatory agencies prohibit some adjustments or have established operating conditions for vehicle engines that require adjustments to an engine's operation that can only be accomplished with special test equipment.

In addition to the complexity of individual parts of a vehicle's drive system, the specifications for some vehicles are further complicated by the many options that are available to the vehicle owner in body style, engine size and type, transmission, and accessory equipment. Some vehicles have different specifications depending upon the factory where the vehicle was assembled or the time in the model year when the vehicle was completed. In some cases manufacturers have changed specifications on particular vehicle engines because of design improvements, original errors or changes in regulations.

Most manufacturers supply some essential vehicle specifications in readable form fixed to the vehicle. Such specifications provide identification for the vehicle and other pertinent information that will enable a person servicing the vehicle to identify vehicle and engine specifications. If changes are made in the vehicle, the identification fixed to the vehicle may no longer apply. Further, if the manufacturer or a regulatory agency makes changes that apply to a particular vehicle, those changes will not be known from a reference to the specifications fixed to the vehicle.

Engine analyzers are also known, some are general purpose for use with many vehicles and some are specific to a particular manufacturer's vehicle, and some manufacturers have built microprocessors into the vehicle so as to provide part or all of the engine analysis function. Some engine analyzers merely measure existing conditions in a vehicle and are unable to compare the measured conditions to a standard on a particular specification. Other analyzers provide complete diagnostic capabilities including advising the operator on what corrections should be made.

Experts use a whole host of devices to help them diagnose problems. A lot of devices of the market are large and cumbersome and difficult to maneuver. Furthermore, the market for these products is limited by the mere fact of their cost. As a result of the complicated cars and non-universal equipment, there has arisen a need for devices capable of performing across the board uniform tasks for all types of automobiles. Essentially, those tools that uniformly measure specific type of information regardless of the vehicle type. Additionally, there has been a push in the industry for smaller more affordable diagnostic equipment. The digital multimeter is one such device. The digital multimeter has evolved into the digital automotive tester.

The new digital automotive tester does everything that a standard multimeter does and beyond. It is capable of measuring a deluxe ground test to measure the ignition kilovolts. As a result, the numerous plug-in devices have been developed that accompany the sale of the meter for determining all sorts of different data. For instance, it can measure all sorts of electrical data from voltage, resistance and amperage. It can search for bad grounds, voltage drops, intermittent connections or sources of high resistance. The device can also be used to detect the $O_2$ circuit.

What the current digital tester lacks is a device to measure the rotational speed of a rotating object or assembly. Accordingly, it is desirable to provide a plug-in measuring device for measuring rotational speed for use with a handheld digital tester.

SUMMARY OF THE INVENTION

It is therefore an aspect of the present invention to provide a plug-in device for use with a digital automotive tester to measure the rotational speed of a rotating assembly or object.

It is another aspect of the present invention is to provide a handheld device that is easily transportable for the purposes of measuring the rotational speed of a rotating assembly or object.

The above and other features and advantages are achieved through the use of a novel combination of a digital tester and an external measuring device as herein disclosed. In accordance with one embodiment of the present invention, an apparatus for determining the rotational speed of an object comprises an analyzer, which itself is comprised of a display device and a plurality of receptacles for inserting a plurality of devices for measuring data. The apparatus also comprises a device that emits light in the direction of a rotational assembly. The light is reflected from the rotational assembly towards the device. The device can also detect the reflected light. The device is linked to the analyzer through the receptacles located on the analyzer.

The final component of the apparatus is a reflective surface that is attached to the rotational assembly. The surface reflects the emitted light towards the device for detection purposes.

In accordance with another embodiment of the present invention, an apparatus for determining the rotational speed of an object is comprised of a means for analyzing that contains a display means and a means for connecting measuring devices for the purpose of data collection. The second component is a means for emitting and detecting a light. The means for emitting directs the light in the direction of a rotating assembly. The emitted light is reflected back from the rotating assembly and detected by the means for detecting. The final component is a means for reflecting, which is attached to the rotating assembly. The means for reflecting reflects the light in the direction of the means for detecting.

In accordance with another embodiment of the present invention, a method for determining the rotational speed of objects is comprised of the initial step of emitting a light towards a rotational assembly or an object that one wishes to determine the rotational speed. The light is emitted by a device that is capable of both emitting and detecting the light. The device is connected to an apparatus comprising a display device and a plurality of receptacles through which the device for emitting and detecting connects.

Another step of the method is reflecting the light through the use of a reflective surface. The reflective surface is placed or attached to a rotational assembly. The surface reflects and directs the light towards the device in order for it to be detected. The detected signal is then passed to the tester, where the rotational speed is determined.

In accordance with another embodiment of the present invention, a plug-in apparatus connects into a digital tester. The plug-in determines the rotational speed of an object. The plug-in is comprised of a device that emits light in the direction of a rotational assembly. The light is reflected from the rotational assembly towards the device. The reflected light is detected by the device and transmitted to said digital tester. The device is linked to digital tester through a set of receptacles.

The other component of the plug-in apparatus is a reflective surface that is attached to rotational assembly. The surface reflects the light towards the device for it to be detected. The reflection and the amount of reflection determine the rotational speed.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, is for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 provides a view of a preferred embodiment.

FIG. 2 provides a flow diagram of the method of operating the photo tachometer of FIG. 1.

DETAILED DESCRIPTION OF PREFERRED EMBODIMENTS OF THE INVENTION

A preferred embodiment of the present invention provides the use of a digital tester in combination with a light emitting device and a reflective surface attached to a rotational object or assembly to determine the rotational speed.

A preferred embodiment of the present inventive apparatus and method is illustrated in FIG. 1. In the preferred embodiment, the analyzer is a digital automotive tester 10 by Owatanna Tool Corporation (OTC) of Michigan used in combination with a device 12 to determine the rotational speed per minute (RPM) of an object or an assembly such as an engine. The device 12 must be capable of transmitting and receiving light. The device 12 in FIG. 1 is the combination of an optical transducer 14 and a module 16. The module 16 connects or links optical transducer to the digital automotive tester 10. The optical transducer 14 has at the transmitting end 18 a transmitting light emitting diode 20 (LED) and a detecting LED 22. The module 16 uses a battery to power the diodes 20, 22 with 5 volts.

The optical transducer 14 is comprised of an emitting and detecting area. It is possible to use a single device that can both emit the light as well as detect the light from the reflected surface. In the preferred embodiment, the use of a light emitting diode 20 is combined with a detecting diode 22. However, the invention is not limited by the use of dual diodes. The optical transducer 14 simply emits light and detects the reflected light.

To start the process, power is supplied to the diodes 20,#22 through a switch 24 located on the module 16. The transmitting diode 20 is positioned towards the assembly or object to determine the rotational speed. The object or assembly is attached with a reflective surface 26. In the preferred embodiment, the reflective surface 26 is reflective tape. The tape 26 is attached, for example, to a rotating object on a car. A transmitting diode 20 is then pointed at the rotating object. A transmitting diode 20 emits light onto the rotating object. Each time the tape 26 comes in range of the emitting light, it is reflected back to the probe where it is captured by a detecting LED 22. The signal is sent to the module 16, which in turn converts it to a signal the digital automotive tester 10 is able to read.

The module 16 contains a power supply to power both LEDs 20, 22 as well as circuitry to reduce the signal or data received by the detecting LED 22 to a point where the digital automotive tester can read it. At the end of the module 16 that is inserted into the digital automotive tester 10 there are two male prongs 28. These prongs 28 are inserted into female receptacles 29 that are present on the tester 10. This male to female 29 connection enables communication between the devices.

The connection of the module 16 to the automotive tester 10 need not be hardwire. Currently technology allows for the transference of the detected signal to occur a number of different ways. It could be an infrared transmission for short distance or even a radio transmission for longer distances. The device is not limited to the hardwire connection as detailed in the preferred embodiment.

The module 16 in the preferred embodiment is not limited to the use of a portable power source. In the preferred embodiment, the power source is a battery. However, the power source could entail the use transformers receives it power from a standard 120 alternating current volt source. The transformer steps the voltage down to a direct current power source to around five volts.

At the other end of the module 16, is a receptor or receptacles for the optical transducer. The transducer is plugged into the module which powers the LEDs 20, 22 as well as sends a detected signal.

FIG. 2 is a flow diagram of the method of operating the photo tachometer of FIG. 1. The diagram illustrates how the apparatus and method work to arrive at the rotational speed.

Five volts 40 are applied to the transmitting LED 20 located on the optical transducer or probe 14. After applying the power to the probe, the transmitting LED 20 is constantly transmitting 42. A piece 44 of reflective tape 26 is applied to an object in order to determine its rotational speed. The light from the transmitting LED 20 is reflected 46 off the tape 26 and received at the probe. If no reflection is received 48, then the display reads zero 50. If a reflection is received 52 at the probe, the module or adapter 16 converts 54 the signal so that the digital automotive tester (DAT) can read it. In the preferred embodiment, the digital automotive tester is set at the rotations per minute scale. For example, RPM1 equate to 4-stroke engine and RPM2 equates to a 2-stroke engine. The signal transmitted back to the digital automotive tester is analyzed and the output data is read on the display device 55 of the tester 10.

The analyzer 10 can be any number of different devices. The preferred embodiment uses a digital automotive tester. However, a standard multimeter can be used to determine the rotational speed. Ideally, the signal arriving from the device 16 is signal pulses that are read by the digital automotive tester 10. One pulse equals one RPM when the digital automotive tester is set to one cylinder. Therefore, the device used to calculate the rotational speed reads an electrical signal produced by the module 16. One of skill in the art will recognize the number of products on the market as well devices that can be assembled to read the electrical signal from the module 16.

The reflective surface 26 is not limited to reflective tape. Any surface capable of reflecting the light can be used. For example, a surface metal, a mirror or simply any surface capable of reflecting the light can be attached to the rotational surface and used as the reflective surface. Furthermore, in some instances, reflective tape may not be the ideal reflective for a number of reasons. Thus, the invention is not limited to the use of reflective tape.

The invention is not limited to the use with automotive parts as well. In fact, the invention can be used to measure the rotational speed of any rotational object or assembly. For example, the invention can be used to detect the rotational speed of turbine engines. Turbine engines are located in a variety of areas from airplanes to power plants. In all of these areas, it is possible for the invention to be used to determine rotational speed. Thus, the device is capable of being used to measure the rotational speed of any object or assembly.

In the airplane maintenance, the device would be handy for on the spot checking of the turbine engines. This in some instance would negate having the plane taken back to the service hanger. The portability of the device enables a mechanic to secure a reflective surface to the turbines and then secure the device in a location to detect the reflection of the emitted light.

In power plants, turbine engines are used to produce power. However, these devices are large and dangerous. The fins on the engines are sharp. A device could be secured to stable position and a reflective surface 26 attached to the turbines in order to determine the rotational speed.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for determining a rotational speed of an object, comprising:
    an analyzer comprising a display device and a plurality of receptacles for inserting a plurality of devices for measuring data;
    a device for emitting and detecting light, wherein said device is linked to said analyzer through said plurality of receptacles, said device emits light in a direction of a rotating assembly, said light is reflected from said rotating assembly and detected by said device whereupon said light is converted to a signal, said signal is transmitted to said analyzer to determine the rotational speed; and
    a reflective surface attached to said rotational assembly, said surface reflects said light towards said device whereupon it is detected and converted to a signal.

2. The apparatus of claim 1 wherein said analyzer is a digital multimeter.

3. The apparatus of claim 1, wherein said analyzer is an automotive tester.

4. The apparatus of claim 1 wherein said device is an optical transducer.

5. The apparatus of claim 1 wherein said reflective surface is reflective tape.

6. The apparatus of claim 1 wherein said receptacles are female prong receptors.

7. A system for determining the rotational speed of an object comprising:
    means for analyzing comprising a display means and means for connecting data measuring devices;
    means for emitting and detecting a light, said means for emitting directs said light in a direction of a rotating assembly, said light is reflected from said rotating assembly and detected by said means for detecting; and
    means for reflecting attached to said rotating assembly, said means for reflecting reflects said light in a direction of said means for detecting.

8. The system as in claim 7 wherein the means for analyzing is a digital mulitmeter.

9. The system as in claim 7 wherein the means for analyzing is a digital automotive tester.

10. The system as in claim 7 wherein the means for detecting and the means for emitting is an optical transducer.

11. The system as in claim 7 wherein the means for reflecting is reflective tape.

12. The system as in claim 7 wherein the means for connecting are female receptacles.

13. A method for determining the rotational speed of an object comprising:
    providing an apparatus comprising a display device and a plurality of receptacles;
    connecting a light emitting and detecting device to said plurality of receptacles;
    attaching a reflective surface to a rotational assembly;
    emitting a light towards said rotational assembly by said light emitting and detecting device;
    reflecting said light by the reflective surface; and
    directing said light towards said light emitting and detecting device.

14. The method as in claims 13 wherein said light emitting and detecting device is an optical transducer.

15. The method as in claim 13 wherein said apparatus is a digital multimeter.

16. The method as in claim 13 wherein said apparatus is a digital automotive tester.

17. The method as in claim 13 wherein said reflective surface is reflective tape.

18. The method of claim 13 wherein said plurality of receptacles are female receptacles.

19. A plug-in apparatus for a digital tester to determine rotational speed comprising:

a device emitting and detecting light in and from a direction of a rotational assembly wherein said device is linked to said digital tester; and a reflective surface attached to said rotational assembly, wherein said light is reflected from said reflective surface of said rotational assembly towards said device, and wherein said reflected light is detected by said device and transmitted to said digital tester.

20. The plug-in apparatus as in claim 19 wherein said device is an optical transducer.

21. The plug-in apparatus as in claim 19 wherein said reflective surface is reflective tape.

* * * * *